W. G. STEWART.
THRESHING MACHINE.
APPLICATION FILED MAR. 6, 1908.
978,072.
Patented Dec. 6, 1910
4 SHEETS—SHEET 2.
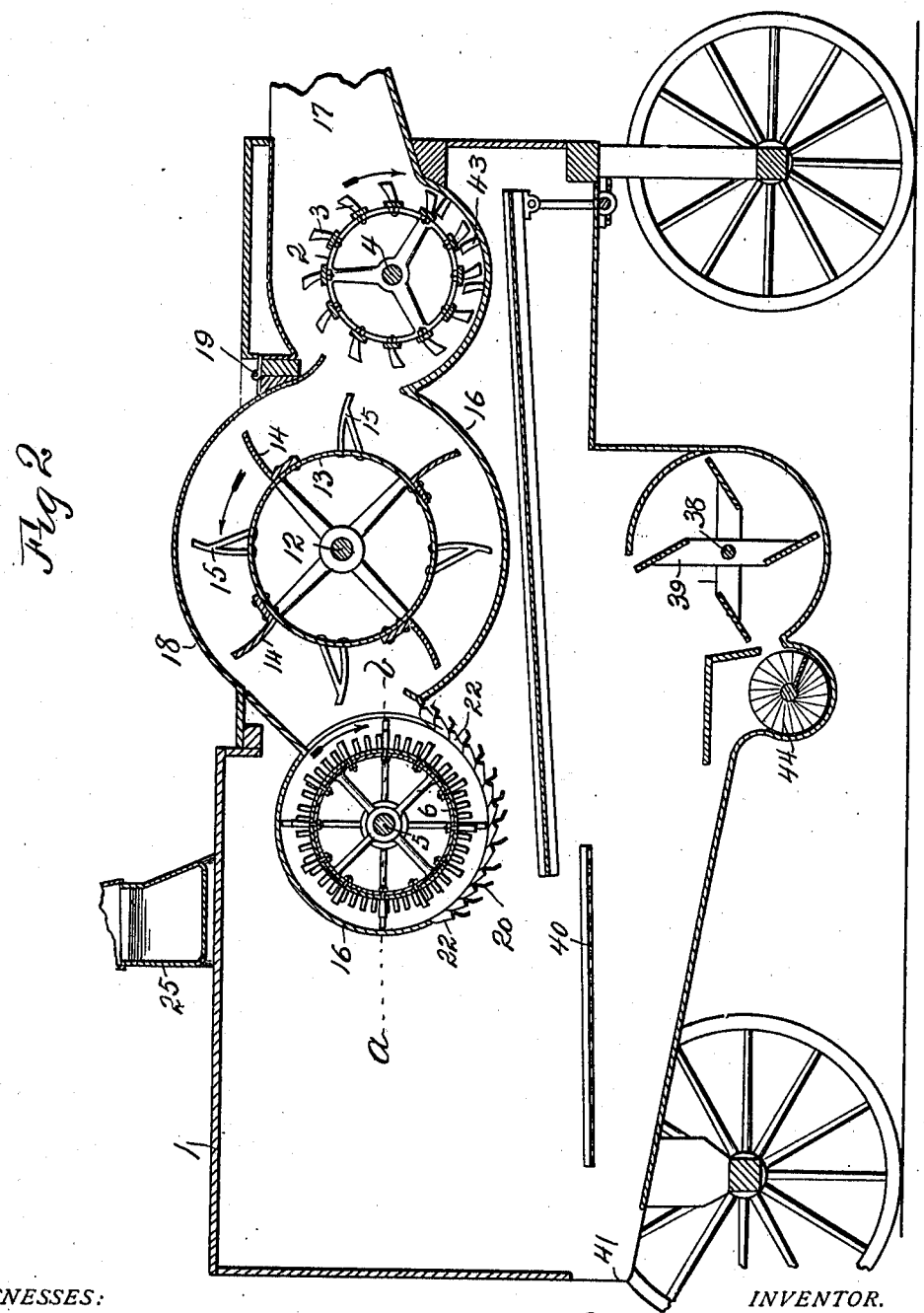
WITNESSES:
R. E. Hamilton
E. B. House
INVENTOR.
W. G. Stewart
BY
Warren D. House,
His ATTORNEY.

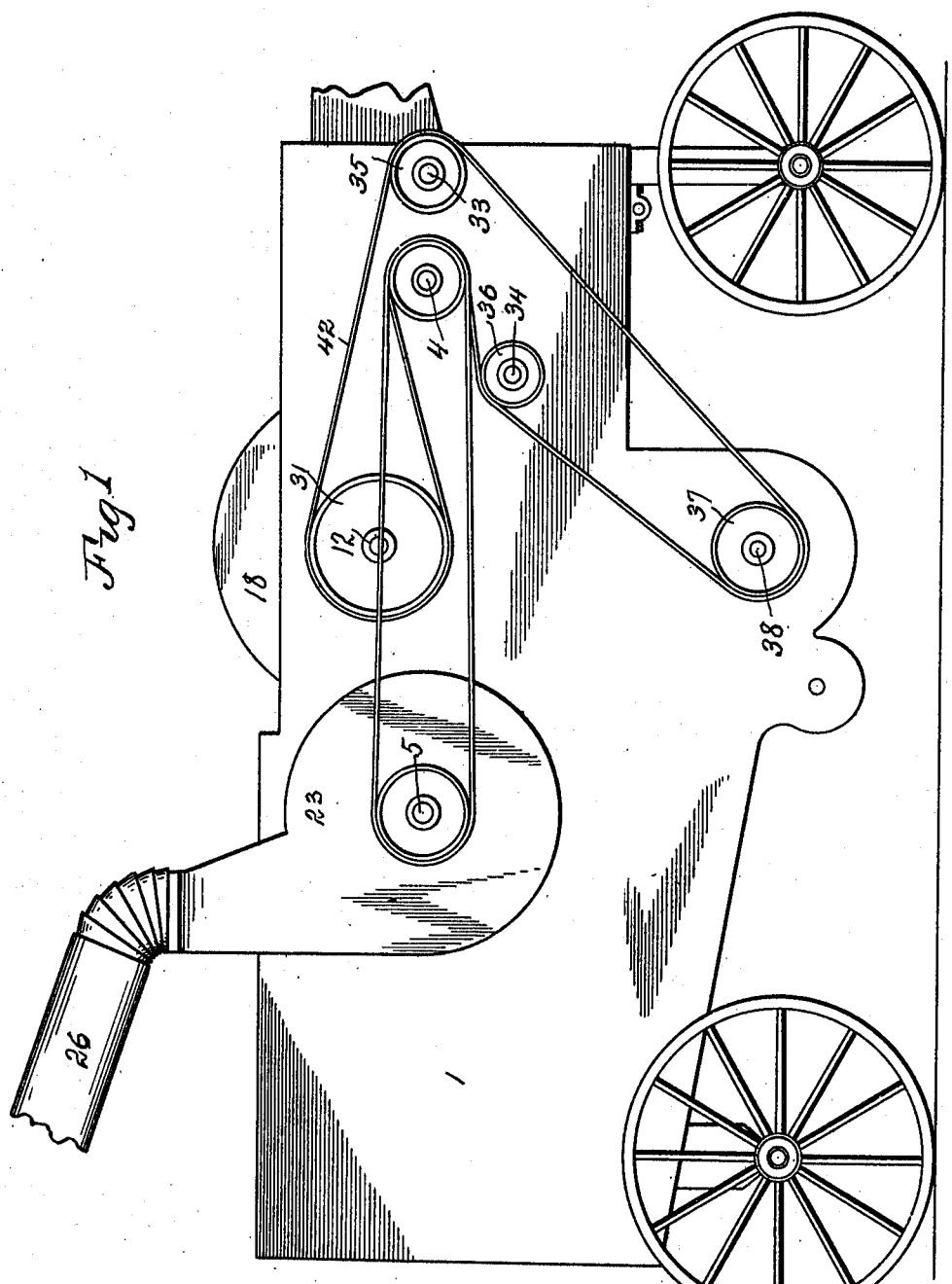

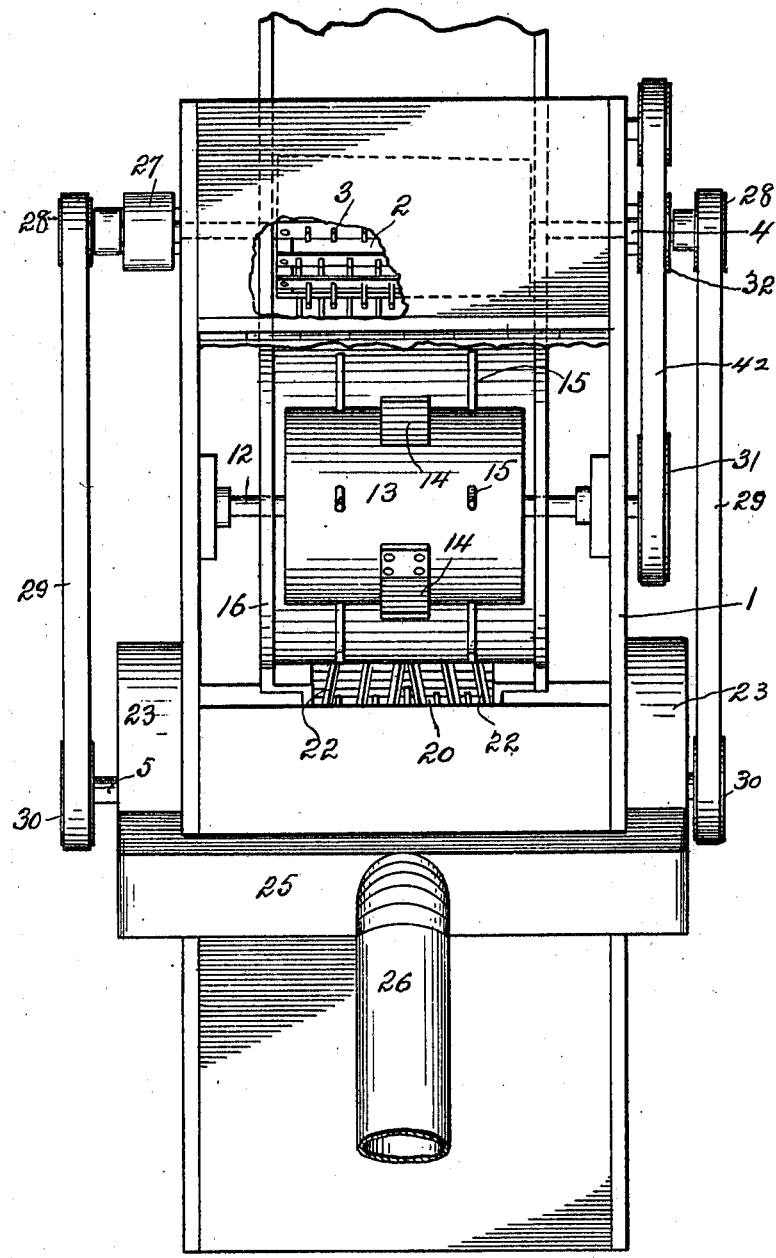

W. G. STEWART.
THRESHING MACHINE.
APPLICATION FILED MAR. 6, 1908.
978,072.
Patented Dec. 6, 1910.
4 SHEETS—SHEET 4.
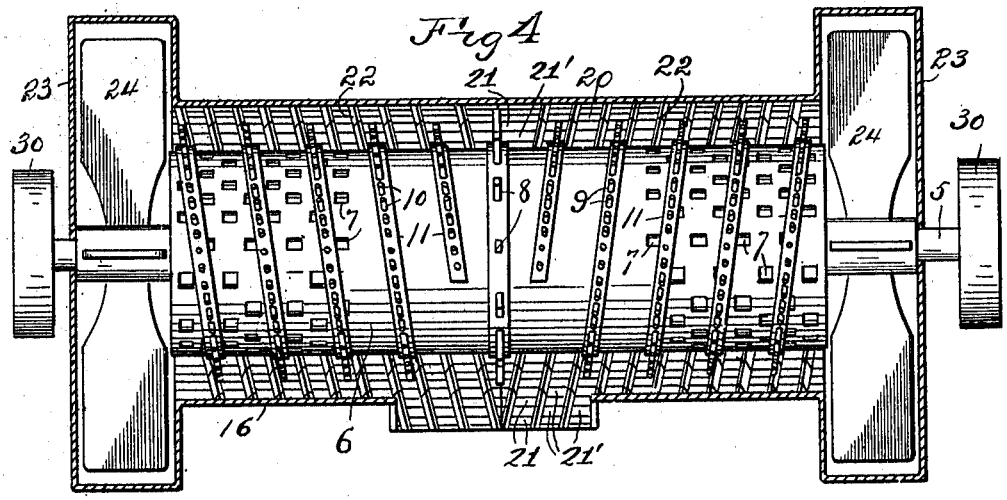
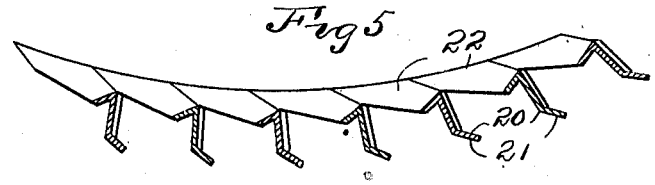
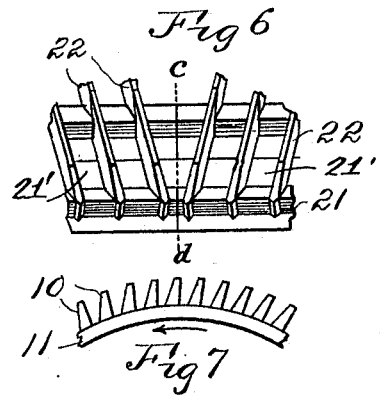
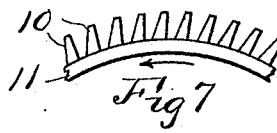
WITNESSES:
R. E. Hamilton
E. B. House
INVENTOR.
W. G. Stewart
BY Warren D. House,
His ATTORNEY.

UNITED STATES PATENT OFFICE.

WILLIAM G. STEWART, OF KANSAS CITY, KANSAS.

THRESHING-MACHINE.

978,072.  Specification of Letters Patent.  Patented Dec. 6, 1910.

Application filed March 6, 1908. Serial No. 419,501.

*To all whom it may concern:*

Be it known that I, WILLIAM G. STEWART, a citizen of the United States, residing at Kansas City, in the county of Wyandotte and State of Kansas, have invented certain new and useful Improvements in Threshing-Machines, of which the following is a specification.

My invention relates to improvements in threshing machines.

The object of my invention is to provide a threshing machine which has large capacity and which will cleanly separate the grain from the straw and chaff.

This invention is of the same general type as the one for which I was granted Letters Patent No. 756,728. The present invention is less complicated than the former one referred to and has a greater capacity and will more cleanly separate the grain. In the former invention the separating drum was provided with peripheral spiral continuous blades for forcing the straw lengthwise of the drum, while in the present invention the blades are displaced by separate teeth which get a grip upon the straw and feed it much faster than can be done with continuous smooth blades.

A further feature of improvement consists in providing a positively actuated means for carrying the threshed material from the threshing cylinder to the drum and depositing it on the teeth of the drum with considerable force, thereby enabling said teeth to grip the straw.

Another feature of this invention is the providing of a drum having an imperforate peripheral portion upon which the threshed material is first deposited. By this construction the grain can not be thrown into the drum through the peripheral openings but remains on the surface of the drum until thrown off by centrifugal force, after which it finds its way through the peripheral openings provided in a casing encircling the drum.

Still another feature of my invention is the providing of spirally arranged peripheral guides on the inner side of the casing inclosing the drum, by which assistance is given the spirally arranged teeth on the drum in dividing and forcing the straw endwise of the drum, thus increasing the capacity of the machine to dispose of the straw.

Other novel features are hereinafter fully described and claimed.

In the accompanying drawings which illustrate a preferred form of my invention, Figure 1 is a side elevation of my improved threshing machine. Fig. 2 is a vertical sectional central view of the machine. Fig. 3 is a top view with some of the parts broken away or removed. Fig. 4 is a horizontal sectional view through the casing encircling the separating drum, taken on the dotted line *a—b* of Fig. 2. In this view the separating drum is shown in plan. Fig. 5 is a vertical sectional view taken on the dotted line *c—d* of Fig. 6. Fig. 6 is a plan view of part the screen in the casing which encircles the drum. Fig. 7 is a side elevation of a part of one of the toothed curved plates which are mounted on the separating drum.

Similar characters of reference denote similar parts.

1 denotes the frame of the machine, which may be of the ordinary rectangular shape.

2 denotes the ordinary horizontal threshing cylinder provided with peripheral teeth 3, and secured rigidly upon a horizontal shaft 4, which extends through opposite vertical sides of the frame 1. A horizontal shaft 5 extends through the opposite sides of the frame 1 in which said shaft is rotatively mounted.

Secured rigidly upon the shaft 5 is the horizontal separating drum 6 which is provided preferably with an imperforate middle portion and with perforations 7 intermediate the ends of the drum and imperforate middle portion. The drum 6 is provided with means for dividing the threshed material deposited on the imperforate portion of the drum and forcing said material in opposite directions toward the ends of the drum. The preferable means for accomplishing this function comprises the following described parts:—
Around the middle portion of the drum are mounted a series of radial, peripheral teeth 8, which serve to divide the threshed material. At opposite sides of the teeth 8 the drum 6 is provided with spirally arranged guiding means, comprising preferably two spiral rows of peripheral inclined teeth, the teeth of said two rows being denoted respectively by 9 and 10. These teeth are preferably secured at their inner ends to plates 11, fitted to the periphery of the drum 6 and secured thereto by any suitable means. As shown in Fig. 7, the teeth 9 and 10 are preferably inclined, the inclination running in a direction opposite to the direction of rotation of the drum 6. These teeth may, however, be disposed radially, as shown in Fig. 2. A horizontal shaft 12 is rotatively mounted in opposite vertical sides of the frame 1 and has rigidly secured to it a horizontal drum 13, which is preferably provided with a central row of fan blades 14, disposed transverse to the direction of rotation of the drum 13 and preferably curving outward in a direction opposite to the direction of movement of the said fan. A plurality of teeth 15 are secured to the periphery of the drum 13 and are preferably curved in the same manner as the fan blades 14. The drum 13 is disposed intermediate the drum 6 and the cylinder 2 and the shafts 4, 5, and 12 are disposed parallel with each other. A casing 16 envelops the drums 6 and 13 and the cylinder 2. This casing is provided adjacent the cylinder 2 with an inlet 17 through which the material to be threshed is fed against the threshing cylinder. The casing 16 on its middle upper portion is provided with an opening which is normally closed by a cover or closure 18 which is pivoted by a hinge 19 to the frame 1. The frame 1 is provided in its top with a vertical opening in which is mounted this cover 18. The casing 16 where it encircles the drums 6 and 13 and the cylinder 2, is disposed concentric with these members, annular spaces being provided between the casing and the teeth of the said drums and cylinder for the passage of straw. The lower side of the casing 16 underneath the drum 6 is provided with an opening in which is fitted a screen 20, consisting preferably of a plurality of bars 21 disposed parallel with the drum 6 and provided each with a plurality of blades 22 disposed on the upper side of said bars 21 and extending laterally and obliquely to said bars. Between the bars 21 and ribs 22 are screen openings 21'. The bars 21 are disposed parallel with each other in the arc of a circle, with the blades of one bar overlapping the next adjacent bar and in alinement with the corresponding blades of the bar which they overlap. The blades 22 thus serve to form ribs for guiding the straw toward the ends of the drum 6.

It will be noted by referring to Figs. 4 and 6 that the blades 22 of the two sets of bars 21, which are disposed at opposite sides of the middle of the drum, incline respectively in opposite directions. The ribs formed by the blades 22 of each set lead in a direction opposite to the direction of the lead of the adjacent row of spirally arranged teeth on the drum 6. By means of this construction when the drum 6 is rotated in the proper direction the peripheral spirally arranged teeth on the drum 6 will coöperate with the adjacent rows of guides or ribs formed by the blades 22 to force the straw toward the ends of the drum 6.

At opposite sides of the frame 1 are provided two chambers 23 in which are respectively mounted fans 24, which are rigidly secured to the shaft 5. The chambers 23 are connected with and discharge into opposite ends of a transverse conductor 25, to the central portion of which is connected one end of a discharge pipe 26, through which the straw and chaff is discharged from the machine.

The shaft 4 has mounted thereon rigidly a pulley 27, which may be turned by any suitable motive power, not shown. Upon the outer ends of the shaft 4 are secured two pulleys 28, which are respectively connected by belts 29 with two pulleys 30, secured respectively upon opposite ends of the shaft 5. Rigidly secured on the shaft 12 is a pulley 31. On the shaft 4 at the adjacent side of the frame 1 is rigidly secured a pulley 32. On the same side of the frame are secured two horizontal studs 33 and 34, on which two pulleys 35 and 36 are respectively rotatively mounted. A pulley 37 is rigidly mounted upon a horizontal fan shaft 38 which is rotatively mounted on opposite sides of the frame 1 and has secured thereon the ordinary fan blades 39, which are disposed below the drum 13 and within the frame 1. The fan blades 39 are provided for the purpose of blowing out dirt and chaff which may pass with the grain through the screen 20. Below the screen 20 are disposed the ordinary riddles, one of which is indicated by 40. 41 denotes an outlet at the rear end and lower side of the frame 1 through which such dirt and chaff escapes. A belt 42 is mounted on the pulley 31 and passes from the upper side thereof over the pulley 35, thence around the pulley 37 and over the pulley 36 to the pulley 32, shown in Fig. 3, thence around pulley 32 to the under side of the pulley 31.

From the above description it will be noted that when the shaft 4 is rotated the cylinder 2 and drum 6 will be rotated in a like direction and the drum 13 will be rotated in a direction contrary to the direction of rotation of the drum 6 and cylinder 2.

In the operation of my invention the material to be fed is placed in the casing 16 through the inlet 17 and against the teeth 3 of the cylinder 2. Below the cylinder 2 in the casing 16, are provided upwardly extending teeth 43. The grain will be threshed by contact with the teeth 3 and 43 and will be thrown by the teeth 3 against the teeth 15 and blades 14 which will carry the threshed material under the cover 18 and dash it upon the imperforate periphery of the drum 6. The drum 6 in revolving will cause the teeth 8 to divide the material and at each side of these teeth it will be seized by the spirally arranged teeth 9 and 10, and carried toward the ends of the drum 6 and will be deposited in the chambers 23 and from there forced out the discharge pipe 26 by the fans 24. The grain carried by the straw will be forced by centrifugal action against the inner wall of the casing 16 from which it will pass through the screen 20 upon the riddle 40 and thence upon the upper side of the bottom of the frame 1, from which it may be removed in any desired manner, as, for instance, by the ordinary horizontal screw 44, which may be rotated in any desired manner. The fans 24 in revolving will draw air through the openings 7 and will thus draw the lighter material, such as chaff and dirt, into the drum 6 and thence through both open ends of the drum into the chambers 23, from which it will be forced by the fans through the conductor 25 and discharge pipe 26.

My invention may be modified in many ways within the scope of the appended claims, without departing from its spirit.

Having thus described my invention, what I claim and desire to secure by Letters Patent, is:—

1. In a threshing machine, the combination with a rotary separating drum having a spiral row of peripheral teeth for engaging the straw and forcing it endwise of the drum, said teeth inclining in a direction opposite their direction of movement, of a casing encircling said drum and provided with peripheral openings.

2. In a threshing machine, the combination with a rotary separating drum having spirally arranged peripheral devices for engaging the straw and forcing it endwise of the drum, of a casing encircling said drum and provided with peripheral openings and having on its inner periphery spirally arranged guiding ribs leading in a direction corresponding to the direction in which the straw is forced by said spirally arranged devices.

3. In a threshing machine, the combination with a rotary device provided with a spiral row of peripheral teeth, of a casing encircling said device and provided with peripheral openings, and a spiral guiding rib on its inner periphery running in a direction opposite the direction in which said spiral row of teeth runs.

4. In a threshing machine, the combination with a rotary drum having one open end and peripheral openings and having peripheral spirally arranged devices for forcing the straw endwise of the drum, of a casing encircling said drum and provided with peripheral openings and having on its inner periphery spiral guiding means for assisting said spirally arranged devices in forcing the straw endwise of the drum.

5. In a threshing machine, the combination with a rotary drum having an open end and peripheral openings and provided with peripheral spirally arranged teeth for forcing the straw toward the open end of the drum, of a casing encircling said drum and provided with peripheral openings and having on its inner periphery spiral guiding means leading toward the open end of the drum and in a direction corresponding to the direction of movement in which the straw is forced by said spirally arranged teeth.

6. In a threshing machine, the combination with a rotary device, having means for dividing the straw and grain and forcing it in opposite directions parallel with the axis of said device, of a casing encircling said device and having peripheral openings for the passage therethrough of grain and provided with guiding means on its inner periphery coöperating respectively with said dividing and forcing means of the said device to divide and force the straw endwise of said device.

7. In a threshing machine, the combination with a rotary drum having two open ends and peripheral openings and having peripheral means for dividing the straw and grain and forcing it toward the ends of said drum, and a casing encircling said drum and having peripheral openings and provided on its inner periphery with guiding means coöperating with the peripheral means on the drum for dividing and forcing the straw endwise of the drum in opposite directions.

8. In a threshing machine, the combination with a rotary drum having peripheral openings and open ends, two spiral rows of peripheral teeth, said rows running respectively around the periphery of the drum from near the middle portion toward the ends thereof, of a casing encircling said drum and provided with peripheral openings and having on its inner periphery guiding means coöperating with said two rows of teeth to divide the straw and force it toward the ends of the drum.

9. In a threshing machine, the combination with a rotary drum having a central imperforate portion and open ends and peripheral openings intermediate of the ends and said imperforate portion, and provided with two spiral rows of peripheral teeth running respectively around the drum from near the middle thereof toward the ends of the drum, of a casing encircling said drum and having peripheral openings and provided on its inner periphery with two sets of spiral guides coöperating respectively with said two rows of teeth for dividing the straw and forcing it toward the ends of the drum.

10. In a threshing machine, the combination with a rotary drum having peripheral openings and open ends and having two spiral rows of peripheral teeth running around the drum from near the middle thereof toward the ends of the drum, of a casing encircling said drum and having peripheral openings for the passage of grain and provided on its inner periphery with two sets of spirally arranged guiding ribs disposed respectively adjacent to said two rows of teeth, said ribs inclining in a direction opposite the inclination of the adjacent rows of teeth.

11. In a threshing machine, the combination with threshing means, of a rotary drum having peripheral perforations and having spirally arranged devices on its periphery for forcing the straw of the threshed material endwise of the drum, and provided with an open end, a casing encircling said drum and provided with peripheral perforations for the passage of grain, and means for carrying the threshed material from the threshing means and depositing it on the periphery of said drum, the casing having on its inner periphery spirally arranged guides for coöperating with the spirally arranged devices on the drum to force the straw lengthwise of the drum.

In testimony whereof I have signed my name to this specification in presence of two subscribing witnesses.

WILLIAM G. STEWART.

Witnesses:
E. B. House,
Warren D. House.